United States Patent

[11] 3,632,967

[72] Inventors Joseph M. Saltzer, Sr.
Osseo;
Roger L. Coult, Minneapolis; Guido James
Lauterbach, Anoka, all of Minn.
[21] Appl. No. 11,396
[22] Filed Feb. 16, 1970
[45] Patented Jan. 4, 1972
[73] Assignee The Upjohn Company
Kalamazoo, Mich.

[54] APPARATUS FOR CUTTING PLASTIC SHEET
MATERIAL
1 Claim, 2 Drawing Figs.
[52] U.S. Cl.................................................. 219/214,
156/515
[51] Int. Cl.................................................. H05b 3/00
[50] Field of Search........................................ 219/243,
214; 156/515; 93/DIG. 1; 83/15, 16

[56] References Cited
UNITED STATES PATENTS
2,929,907 3/1960 Collins .......................... 219/214 X
3,131,278 4/1964 Rosenthal....................... 219/214
3,354,018 11/1967 Lazear et al. .................. 156/515 X
3,393,291 7/1968 Tucker........................... 219/243

Primary Examiner—C. L. Albritton
Attorneys—John Kekich and Sidney B. Williams, Jr.

ABSTRACT: Apparatus for cutting plastic sheet material including means for preventing sheet material still attached to the sheet supply source from adhering to the hot wire. An electrical resistance wire is mounted transversely on a frame. An upwardly extending deflector means is mounted between said wire and the frame and is mounted on the frame. Feed means for supplying a sheet of plastic material to the wire can be mounted on the frame.

INVENTORS
JOSEPH M. SALTZER, SR.
ROGER L. COULT
GUIDO JAMES LAUTERBACH
BY
Sidney B. Williams Jr.
ATTORNEY

APPARATUS FOR CUTTING PLASTIC SHEET MATERIAL

BRIEF SUMMARY OF THE INVENTION

This invention relates to an apparatus for cutting plastic sheet material having thereon means for preventing sheet material still a part of the supply source from adhering to the cutter.

The cutting of plastic sheet material with hot wire cutters is known in the art. However, one problem with the operation of the known hot wire cutters is that once a piece of sheet has been cut, the sheet that remains connected to the sheet supply has a tendency to adhere or stick to the hot wire. This problem is particularly apparent in those hot wire cutters wherein the plastic sheet is fed from above to a hot wire cutter mounted transversely.

It is the object of this invention to provide a method and means for cutting plastic sheet material that will alleviate the problem of the sheet adhering to the hot wire.

Other objects of the invention will be apparent to persons acquainted with apparatus of this general type upon reading of the following specification and an inspection of the accompanying drawings.

DETAILED DESCRIPTION

Figure 1:
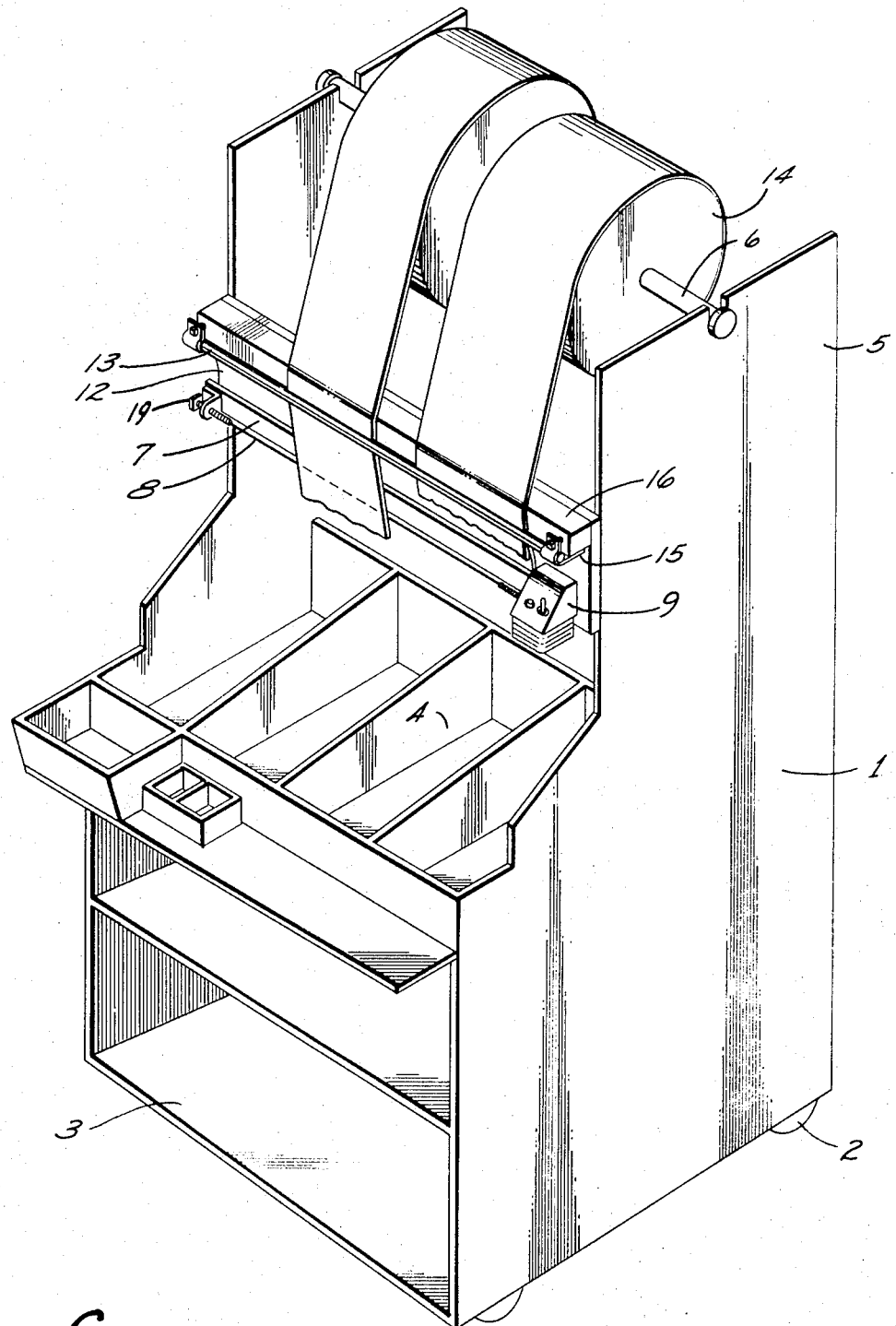
FIG. 1 is a perspective view of a hot wire cutter in accordance with this invention.

Referring first to FIG. 1, the apparatus comprises support means in the form of a frame 1, equipped with rollers 2, which supports various operating parts of the apparatus. The frame is equipped with shelves 3, compartments 4, and upwardly extending side boards 5. A roller 6 for supplying plastic sheet material to the cutter is removably mounted near the top of the sideboards.

Figure 2:
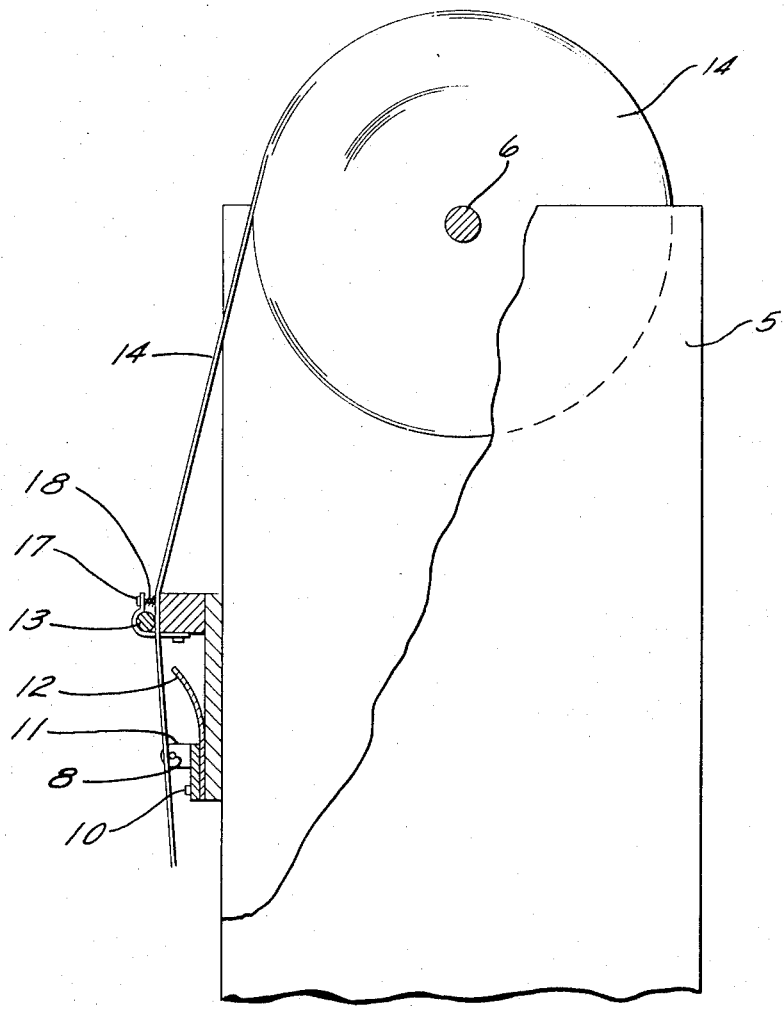
FIG. 2 is a partial side view with parts broken away.

The cutting mechanism (see FIG. 2) comprises a metal plate 7, an electrical resistance wire 8, and energizing means 9. The metal plate is attached to the frame by screws 10. The wire is attached transversely and in spaced relation to the metal plate by mounts 11. The wire can be attached to mounts 11 by conventional adjustable means, for example, adjustable screws 19. The adjustable screws can be utilized to change the tension on the wire. The energizing means, an electrical switch 9, is connected to the wire and to a source of electricity (not shown). The types of switches and methods for their connection to hot wire cutters are well known in the art and will not be described herein.

The deflecting means is in the form of a rigid baffle 12 which is mounted on the frame by bolts 10 between the wire and the frame. The baffle is preferably made of metal; however, it can be constructed of other rigid materials, for example, plastic. Maximum efficiency is realized when the forward most extension of the deflector is between the cutting wire and the frame and the baffle is arcuate shaped. However, baffles having other configurations can be used.

A guide 13 is attached to the frame by clamp 15 on the frame block 16. The purpose of the guide is to facilitate moving the sheet material into position for cutting. The guide and clamp are adjustably attached to block 16 by screw 17 and the spring 18. This arrangement allows the space between the block and the guide to be varied so that plastic sheets of varying thickness can be accommodated.

In operation of the apparatus, a roll of plastic sheet material 14 is put on roller 6 and pulled through the sheet guide 13 by the operator. The electrical resistance wire 8 is energized and then the plastic sheet material is pulled down until the point at which it is to be cut is in contact with the wire. The heat generated by the resistance of the wire severs the plastic. The severed material is removed by the operator. The plastic sheet material still on the roll and still in close proximity to the hot wire moves away from the hot wire and rests against the baffle 12. This movement away from the hot wire prevents the plastic material from adhering thereto.

Although a single somewhat preferred embodiment of this invention has been disclosed and described in detail herein, it will be understood that variations or modifications which lie within the skill of the appended claims are fully contemplated.

What is claimed is:

1. Apparatus for cutting plastic sheet material comprising: (a) support means; (b) an electrical resistance wire mounted transversely on said support means; (c) means mounted on said support means for feeding a sheet of plastic material attached to a supply source vertically downward past said electrical resistance wire; (d) means for energizing said resistance wire sufficient to sever said plastic sheet material as it is brought into contact with said resistance wire; and (e) an arcuate deflector means mounted transversely on said support means with the forwardmost extension of said arcuate deflector means mounted between said electrical resistance wire and said support means so that the severed plastic sheet material attached to said supply source is caused to move away from said electric resistance wire and rest against said deflector means.

* * * * *